United States Patent
Kim et al.

(10) Patent No.: US 12,141,317 B2
(45) Date of Patent: Nov. 12, 2024

(54) TECHNOLOGY FOR DE-IDENTIFYING AND RESTORING PERSONAL INFORMATION IN ENCRYPTION KEY-BASED IMAGE

(71) Applicant: NOTA, INC., Daejeon-si (KR)

(72) Inventors: Sang Tae Kim, Hwasung (KR); Dong Wook Kim, Seoul (KR); Hye Rin Yoo, Seoul (KR); Chih Yuan Hsieh, Seoul (KR); Seong Un Hong, Seoul (KR); Sung Hyun Kim, Seoul (KR); Myungsu Chae, Daejeon (KR)

(73) Assignee: NOTA, INC., Daejeon-si (KR)

( * ) Notice: Subject to any disclaimer, the term of this patent is extended or adjusted under 35 U.S.C. 154(b) by 302 days.

(21) Appl. No.: 17/581,427

(22) Filed: Jan. 21, 2022

(65) Prior Publication Data
US 2022/0237317 A1    Jul. 28, 2022

(30) Foreign Application Priority Data
Jan. 25, 2021    (KR) .................. 10-2021-0009997

(51) Int. Cl.
*G06F 21/62*    (2013.01)
*G06V 10/25*    (2022.01)
*G06V 10/764*   (2022.01)

(52) U.S. Cl.
CPC .......... *G06F 21/6245* (2013.01); *G06V 10/25* (2022.01); *G06V 10/764* (2022.01); *G06F 2221/2107* (2013.01)

(58) Field of Classification Search
CPC .......... G06T 7/11; G06V 10/25; G06V 20/52; G06F 21/6245
See application file for complete search history.

(56) References Cited

U.S. PATENT DOCUMENTS 10,558,815 B2 *  2/2020  Grant .................. G06F 16/9535
2008/0117295 A1 * 5/2008  Ebrahimi ......... G08B 13/19604
                                                        348/143

(Continued)

FOREIGN PATENT DOCUMENTS

| KR | 10-2012-0035299 | 4/2012 |
| KR | 10-1338341 | 12/2013 |
| KR | 10-2019-0081297 | 7/2019 |

OTHER PUBLICATIONS

E. M. Newton, L. Sweeney and B. Malin, "Preserving privacy by de-identifying face images," in IEEE Transactions on Knowledge and Data Engineering, vol. 17, No. 2, pp. 232-243, Feb. 2005, doi: 10.1109/TKDE.2005.32. (Year: 2005).*

(Continued)

*Primary Examiner* — Robert B Leung
(74) *Attorney, Agent, or Firm* — CHRISTENSEN O'CONNOR JOHNSON KINDNESS PLLC

(57) ABSTRACT

Disclosed is a technology for de-identifying and restoring personal information in an image based on an encryption key. An image processing method for de-identifying and restoring image information, which is performed by an image processing system, may include detecting an object information area in image information, de-identifying the detected object information area by using an encryption key generated in relation to the detected object information area, and restoring the de-identified object information area by using the encryption key.

14 Claims, 8 Drawing Sheets

Original image

De-identified image

Restored image

(56) References Cited

U.S. PATENT DOCUMENTS

| | | | | |
|---|---|---|---|---|
| 2016/0034704 | A1* | 2/2016 | Shim | H04N 23/80 |
| | | | | 726/26 |
| 2017/0287183 | A1* | 10/2017 | Kumar | G06T 5/77 |
| 2018/0365819 | A1* | 12/2018 | Green | G06T 1/0042 |
| 2019/0068895 | A1* | 2/2019 | Hutz | G06V 10/82 |
| 2019/0116290 | A1* | 4/2019 | Edi | G06T 11/60 |
| 2019/0279019 | A1* | 9/2019 | Choi | G06T 13/40 |
| 2020/0007758 | A1* | 1/2020 | Park | G06T 5/00 |
| 2021/0287332 | A1* | 9/2021 | Gayatri | G06T 3/18 |
| 2021/0319144 | A1* | 10/2021 | Ishimaru | G06F 21/6245 |
| 2022/0012362 | A1* | 1/2022 | Kuta | G06V 10/758 |
| 2022/0029789 | A1* | 1/2022 | Secomandi | H04L 9/083 |

OTHER PUBLICATIONS

Korean Patent Office Action issued Jun. 24, 2022 in corresponding Korean Patent Application No. 10-2021-0009997 filed Jan. 25, 2021; 5 pages.

\* cited by examiner

FIG. 1
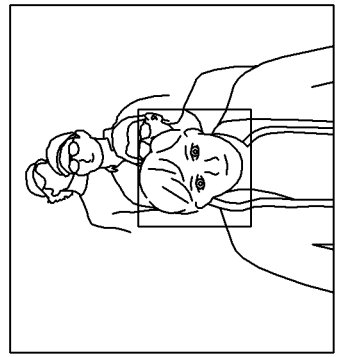
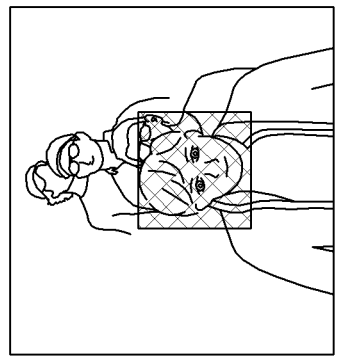
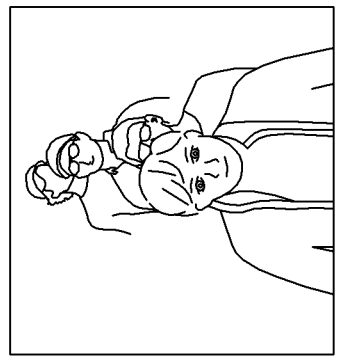

TECHNOLOGY FOR DE-IDENTIFYING AND RESTORING PERSONAL INFORMATION IN ENCRYPTION KEY-BASED IMAGE

CROSS-REFERENCES TO RELATED APPLICATIONS

This application is based on and claims priority under 35 U.S.C. 119 to Korean Patent Application No. 10-2021-0009997, filed on Jan. 25, 2021 in the Korean intellectual property office, the disclosures of which are herein incorporated by reference in their entireties.

TECHNICAL FIELD

The following description relates to an image processing technology and to a method and system for de-identifying and restoring target information detected in image information by using an encryption key.

BACKGROUND OF THE DISCLOSURE

The demand for a de-identification technology, such as privacy issue automatic blurring, with respect to personal information stored in a terminal on which images are recorded, such as a camera for traffic measurement, CCTV, or a digital doorlock, is increasing. Despite an increase in such a demand, a current technology for de-identifying personal information in image information has a problem in that it does not provide a method for restoration.

For example, Korean Patent Application Publication No. 10-2013-0047223 (entitled "apparatus and Method for masking privacy region based on monitoring video images") discloses a construction for covering a privacy protection area of a target object by extracting the target object from an inputted image by using an image collection apparatus, detecting the privacy protection area in the extracted target object, and performing graphic processing on only the detected privacy protection area without deforming an original image of the inputted image.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiment may provide a method and system for de-identifying an object information area detected in the image information by using an encryption key.

Embodiment may provide a method and system for restoring a de-identified object information area in image information by using an encryption key.

In an embodiment, an image processing method for de-identifying and restoring image information, which is performed by an image processing system, may include detecting an object information area in image information, de-identifying the detected object information area by using an encryption key generated in relation to the detected object information area, and restoring the de-identified object information area by using the encryption key.

de-identifying the detected object information area may include de-identifying the detected object information area through any one or more of a first method based on a sorting table and a second method based on a random reversible table by using the encryption key generated in relation to the detected object information area.

The encryption key generated in relation to the detected object information area may be used as a seed value of a pseudo random function. A different encryption key may be assigned to each of object information areas detected in the image information.

de-identifying the detected object information area may include constructing a sorting table in which locations of pixels are rearranged in the detected object information area through the pseudo random function generated based on the encryption key, and rearranging the pixels of the detected object information area by using the constructed sorting table.

de-identifying the detected object information area may include constructing a random reversible table in which pixel values are modulated in the detected object information area through a pseudo random function generated based on the encryption key, and modulating each of the pixel values of the detected object information area by using the constructed random reversible table.

Restoring the de-identified object information area may include constructing a sorting table in which locations of pixels are rearranged in the de-identified object information area through a pseudo random function generated based on the encryption key, and performing a reverse operation on the de-identified object information area by using the constructed sorting table.

Restoring the de-identified object information area may include constructing a random reversible table in which pixel values are modulated in the de-identified object information area through a pseudo random function generated based on the encryption key, and restoring each of the modulated pixel values in the de-identified object information area by using the constructed random reversible table.

Detecting the object information area may include detecting the object information area in the image information by using a learning model for object detection.

Restoring the de-identified object information area may include classifying the object information included in the restored object information area depending on a type of the restored object information area.

An image processing system for de-identifying and restoring image information may include an object information area detection unit configured to detect an object information area in image information, an object information area de-identification unit configured to de-identify the detected object information area by using an encryption key generated in relation to the detected object information area, and an object information area restoration unit configured to restore the de-identified object information area by using the encryption key.

Personal information can be safely protected de-identifying object information area detected in image information and restoring the de-identified object information area.

de-identification and restoration can be performed on a desired object information area of object information areas detected in image information.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 1 is a diagram for describing a de-identification and restoration operation of an image processing system according to an embodiment.

DETAILED DESCRIPTION

Figure 2:
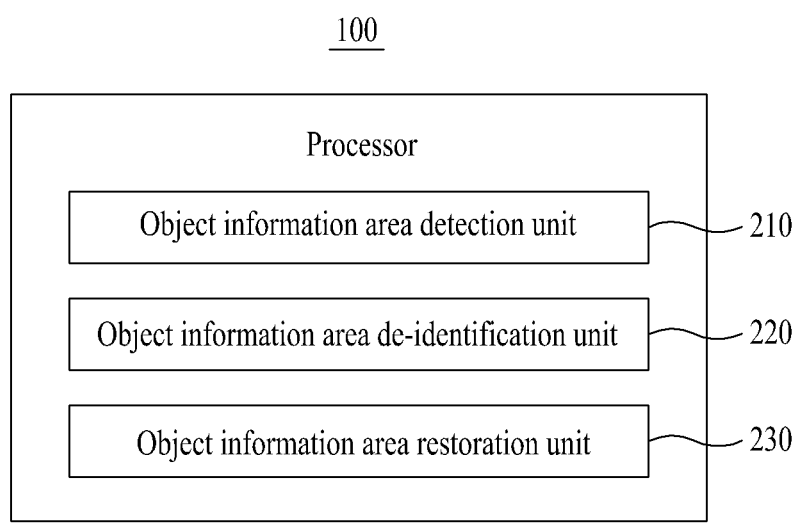
FIG. 2 is a block diagram for describing a configuration of the image processing system according to an embodiment.

While illustrative embodiments have been illustrated and described, it will be appreciated that various changes can be made therein without departing from the spirit and scope of the disclosure.

Hereinafter, embodiments are described in detail with reference to the accompanying drawings.

FIG. 1 is a diagram for describing a de-identification and restoration operation of an image processing system according to an embodiment.

The image processing system may obtain photographed image information from an electronic device. For example, the electronic device may mean an electronic device including a camera, such as a smartphone, a wearable device, CCTV, or a blackbox. Such an electronic device may be fixed and installed at a specific location, and may photograph a specific space. Alternatively, the electronic device may not be installed at a specific location, and may photograph a specific space while moving. The photographing of an object, such as a person or a thing, may be performed by the electronic device.

For example, the image processing system may use image information that is photographed in real time, and may perform a de-identification and restoration operation by using previously (in the past) photographed image information. The image processing apparatus may perform de-identification and restoration on each object information area by recognizing and tracking the object information area that is moved over time configured in image information.

In an embodiment, image information photographed by an electronic device, that is, not-processed image information is written as an original image. The image processing system may detect an object information area in image information photographed by an electronic device. In this case, the image processing system may detect the object information area in the image information by using a learning model for object detection. The learning model for object detection is a model previously trained to detect an object. A deep learning technology may have been applied to the learning model. For example, the learning model for object detection may have been trained to learn a data set (image data) for detecting an object. In this case, the learning model for object detection may be configured based on various networks, such as a CNN or an RNN, but the present disclosure is not limited thereto.

The image processing apparatus may de-identify a detected object information area by using an encryption key generated in relation to the detected object information area. In this case, the encryption key generated in relation to the detected object information area may be used as a seed value of a pseudo random function, and a different encryption key may be assigned to each of object information areas. For example, a plurality of object information areas may be detected in image information. Different encryption keys may be assigned to the plurality of detected object information areas. In this case, a preset encryption key may be assigned in accordance with each of the plurality of object information areas or an encryption key generated based on an encryption key generation method may be assigned to each of the plurality of object information areas.

In this case, the image processing apparatus may set the encryption keys based on values on which the plurality of detected object information areas are classified with respect to the plurality of object information areas. For example, it is assumed that five objects 0 to 4 are detected in image information. The detected five objects are written as an object 0, an object 1, an object 2, an object 3, an object 4, and an object 5. Assuming that the object 0 and the object 3 are divided as a car license plate "0000" and the object 1, the object 2, and the object 4 are divided as a car license plate "0001", two pieces of object information may be de-identified/restored by using an encryption key A in the case of the car license plate "0000", and three pieces of object information may be de-identified/restored by using an encryption key B in the case of the car license plate "0001." In other words, the image processing system may generate a group of object information areas based on the same, similar, or preset criterion with respect to each of object information areas each including one piece of object information, and may apply an encryption key for each group based on an object information area of the generated group. Furthermore, the image processing system may group object information areas included in a plurality of pieces of object information, and may assign an encryption key to each group.

The image processing apparatus may perform the de-identification of a detected object information area by using an encryption key generated in relation to the detected object information area according to any one or more of a first method based on a sorting table and a second method based on a random reversible table. In this case, the de-identification may mean that special processing including an edge, a pattern, a box, blurring or mosaic has been performed on the detected object information area. An object information area detected in image information may be specially processed and displayed. For example, the specially processed object information area may be displayed in a transparent, translucent or opaque (or private) form depending on a special processing method within image information. Furthermore, the image processing system may differently classify a detected object information area depending on the type (e.g., a thing or a person) of an object included in the detected object information area. For example, an object may be pixelized when the object is a person, and a box may be marked in an object when the object is a thing.

The image processing apparatus may restore a de-identified object information area by using an encryption key. The image processing apparatus may make public the restored object information area within image information. In other words, the image processing apparatus may remove special processing from the de-identified object information area within the image information. For example, the image processing apparatus may restore the entire de-identified object information area or only some of a de-identified object information area.

Furthermore, the image processing apparatus may classify object information included in a restored object information area depending on the type of restored object information area. The image processing apparatus may classify object information upon restoration by using determined object information when detecting an object information area, and may classify object information by determining the object information included in a restored object information area after restoring the object information area. For example, pieces of facial information may be classified although restored object information areas are the same facial information.

Figure 3:
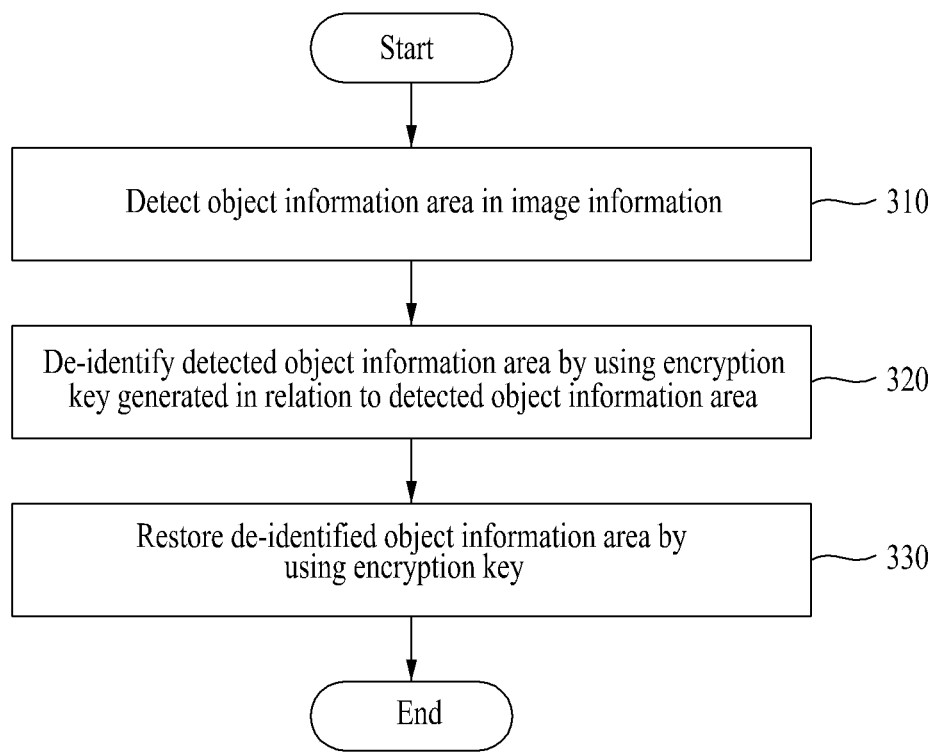
FIG. 3 is a flowchart for describing an image processing method for de-identifying and restoring image information, which is performed by the image processing system according to an embodiment.

FIG. 2 is a block diagram for describing a configuration of the image processing system according to an embodiment. FIG. 3 is a flowchart for describing an image processing method for de-identifying and restoring image information, which is performed by the image processing system according to an embodiment.

A processor of an image processing system 100 may include an object information area detection unit 210, an object information area de-identification unit 220 and an object information area restoration unit 230. Such components of the processor may be expressions of different functions performed by the processor in response to a control command provided by a program code stored in the image processing system. The processor and the components of the processor may control the image processing system to perform steps 310 to 330 included in an image processing method for de-identifying and restoring image information in FIG. 3. In this case, the processor and the components of the processor may be implemented to execute an instruction according to a code of an operating system and a code of at least one program included in a memory.

The processor may load, into the memory, a program code stored in a file of a program for the image processing method for de-identifying and restoring image information. For example, when a program is executed in the image processing system, the processor may control the image processing system to load a program code from a file of a program to the memory under the control of an operating system. In this case, the object information area detection unit 210, the object information area de-identification unit 220 and the object information area restoration unit 230 may be different functional expressions of the processor for executing subsequent steps 310 to 330 by executing an instruction of a part corresponding to the program code loaded onto the memory.

In step 310, the object information area detection unit 210 may detect an object information area in image information. For example, the object information area detection unit 210 may input the image information to a learning model for object detection. The object information area detection unit 210 may detect the object information area in the image information by using the learning model for object detection.

In step 320, the object information area de-identification unit 220 may de-identify the detected object information area by using an encryption key generated in relation to the detected object information area. The object information area de-identification unit 220 may perform de-identification on the detected object information area by using the encryption key generated in relation to the detected object information area according to any one or more of the first method based on a sorting table and the second method based on a random reversible table.

Figure 4:
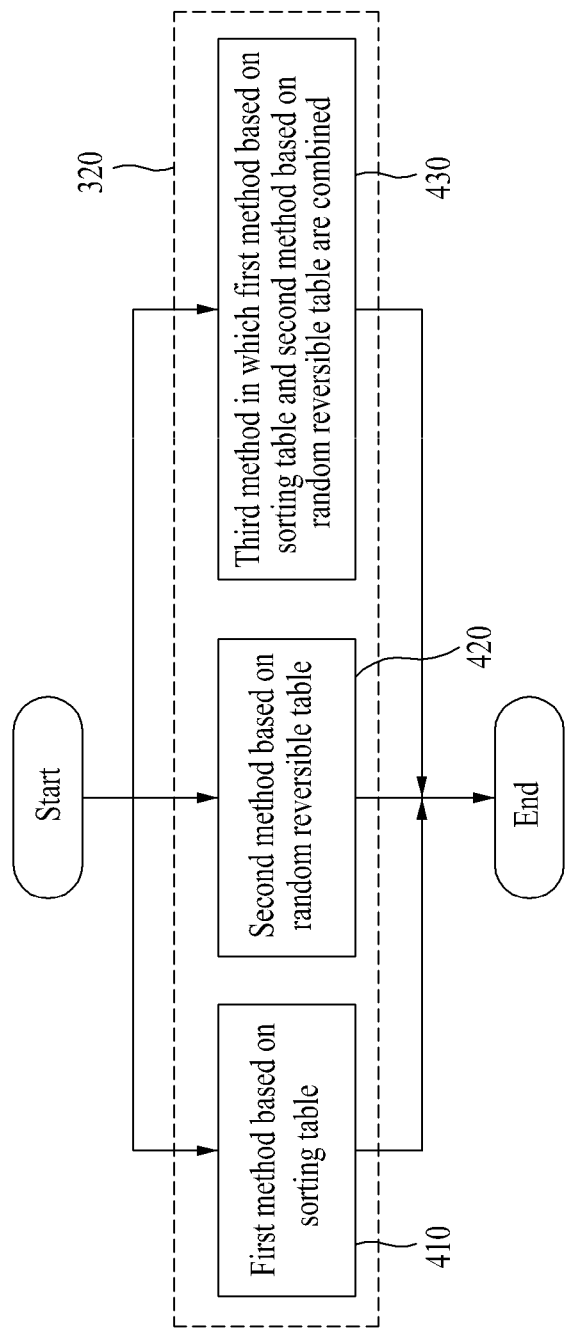
FIG. 4 is a flowchart for describing an operation of de-identifying an object information area in the image processing system according to an embodiment.
Figure 5:
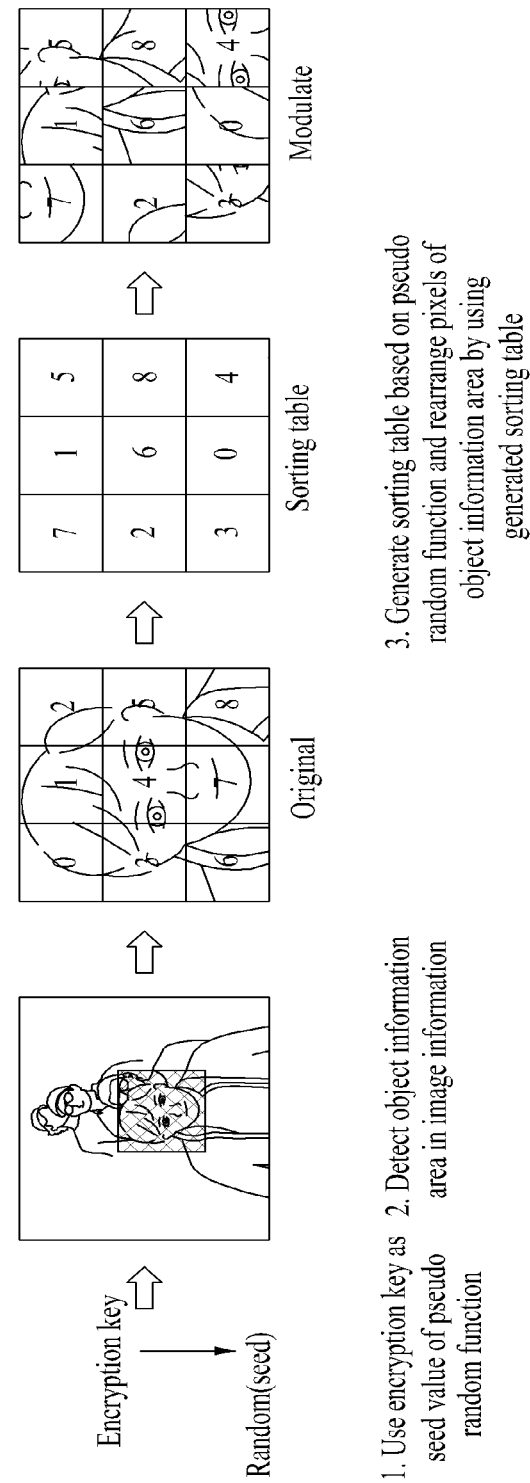
FIG. 5 is an example for describing an operation of de-identifying an object information area in an embodiment.

FIG. 4 is a flowchart for describing a de-identification operation. For example, the object information area de-identification unit 220 may receive a method for performing de-identification, which is selected by a user or a computer program. For example, the object information area de-identification unit 220 may de-identify a detected object information area through a first method 410 based on a sorting table by using an encryption key generated in relation to the detected object information area. The first method based on a sorting table is described with reference to FIG. 5. An operation of randomly rearranging and de-identifying locations of pixels in an object information area by using an encryption key is described with reference to FIG. 5. In an embodiment, an encryption key may be used as a seed value of a pseudo random function. In this case, a sorting table in which locations of pixels are rearranged in a detected object information area may be generated based on a pseudo random function generated by the encryption key. As an object information area is detected in image information, the object information area de-identification unit 220 may rearrange the pixels of the detected object information area by using the generated sorting table.

Figure 7:
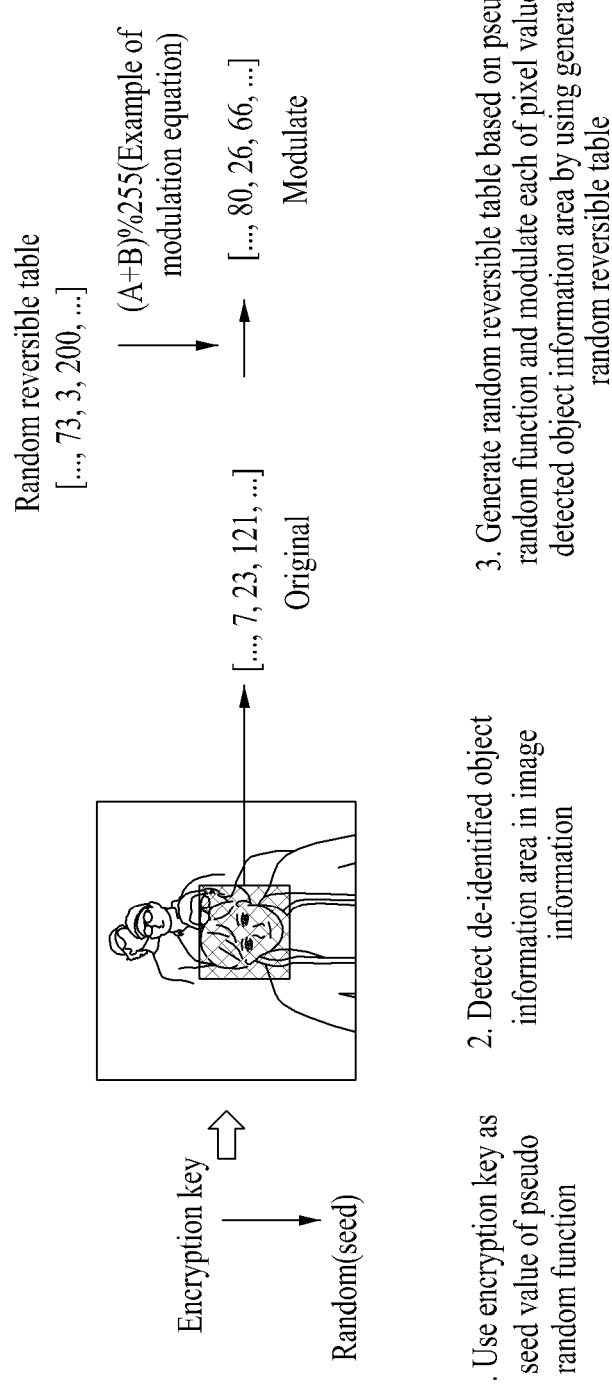
FIG. 7 is another example for describing an operation of de-identifying an object information area in an embodiment.

Furthermore, for example, the object information area de-identification unit 220 may de-identify a detected object information area through a second method 420 based on a random reversible table by using an encryption key generated in relation to the detected object information area. The second method based on a random reversible table is described with reference to FIG. 7. In an embodiment, an encryption key may be used as a seed value of a pseudo random function. In this case, a random reversible table in which pixel values are modulated may be generated in the detected object information area based on the pseudo random function generated by the encryption key. As the object information area is detected in the image information, the object information area de-identification unit 220 may modulate each of pixel values in the pixels of the detected object information area by using the generated random reversible table. In this case, when the pixel values are modulated using the random reversible table, a degree of the modulation may be adjusted based on a modulation equation ((A+B) % 255). In other words, the degree of the modulation may be adjusted through an operation for modulating the pixel values based on RGB color information having values of 0 to 255 for each pixel. In this case, in the modulation equation of FIG. 7, A may mean an original image, and B may mean the random reversible table.

Furthermore, for example, the object information area de-identification unit 220 may de-identify a detected object information area through a third method 430 in which the first method based on a sorting table and the second method based on a random reversible table are combined by using an encryption key generated in relation to the detected object information area. For example, the object information area de-identification unit 220 may de-identify a detected object information area by sequentially or simultaneously performing the first method and the second method on the detected object information area. Alternatively, the object information area de-identification unit 220 may apply the first method to a part of the detected object information area and apply the second method to the remainder of the detected object information area. Contrary, the object information area de-identification unit 220 may apply the second method to a part of the detected object information area and apply the first method to the remainder the detected object information area. In addition to the described operations, an operation of the third method being performed may be various.

Figure 6:
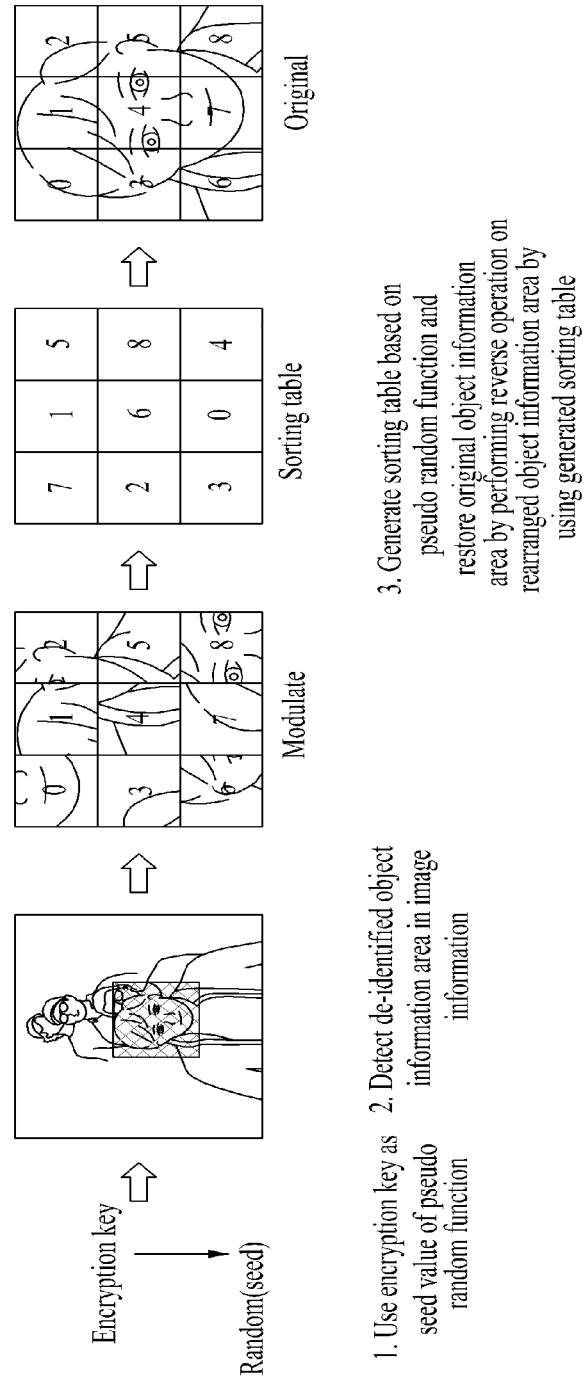
FIG. 6 is an example for describing an operation of restoring an object information area in an embodiment.

In step 330, the object information area restoration unit 230 may restore the de-identified object information area by using the encryption key. An operation of restoring a de-identified object information area by using a sorting table is described with reference to FIG. 6. In an embodiment, an encryption key may be used as a seed value of a pseudo random function. In this case, a sorting table in which locations of pixels are rearranged in a detected object information area may be generated based on the pseudo random function generated by the encryption key. As the de-identified object information area is detected in image information, the object information area restoration unit 230 may perform a reverse operation on the de-identified object information area by using the generated sorting table. Accordingly, the de-identified object information area may be restored.

Figure 8:
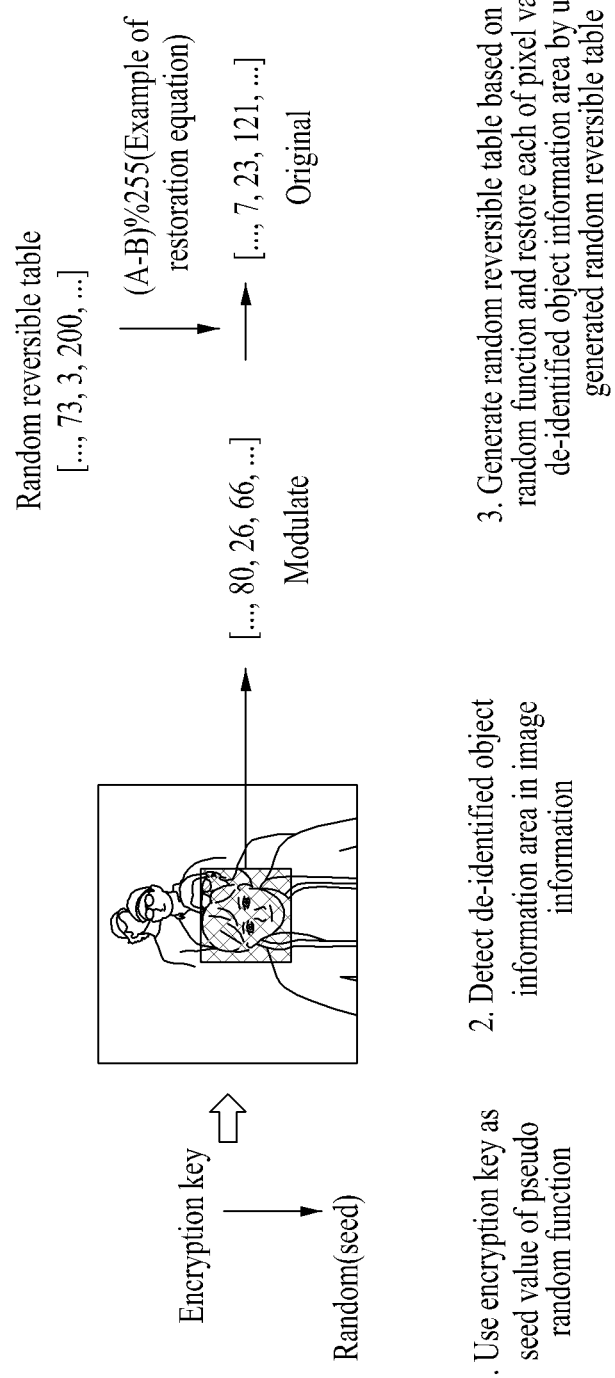
FIG. 8 is another example for describing an operation of restoring an object information area in an embodiment.

An operation of restoring a de-identified object information area by using a random reversible table is described with reference to FIG. 8. In an embodiment, an encryption key may be used as a seed value of a pseudo random function. In this case, a random reversible table in which pixel values are modulated in a detected object information area may be generated based on the pseudo random function generated by the encryption key. As the deidentified object information area is detected in image information, the object information area restoration unit 230 may restore each of pixel values in the pixels of the de-identified object information area by using the generated random reversible table. In this case, when the pixel values are restored using the random reversible table, a degree of the restoration may be adjusted based on a restoration equation ((A−B) % 255). In other words, the degree of the restoration for modulated image information may be adjusted through an operation for modulating the pixel values based on RGB color information having values of 0 to 255 for each pixel. In this case, in the restoration equation of FIG. 8, A may mean the modulated image, and B may mean the random reversible table.

Furthermore, the object information area restoration unit 230 may restore a de-identified object information area through the third method in which the first method based on a sorting table and the second method based on a random reversible table are combined by using an encryption key. For example, the object information area restoration unit 230 may restore a de-identified object information area by sequentially or simultaneously performing the first method and the second method on the de-identified object information area. Alternatively, the object information area restoration unit 230 may apply the first method to a part of the de-identified object information area and apply the second method to the remainder of the de-identified object information area. Contrary, the object information area restoration unit 230 may apply the second method to a part of the de-identified object information area and apply the first method to the remainder of the de-identified object information area. In addition to the described operations, an operation of the third method being performed may be various.

The aforementioned device may be implemented as a hardware component, a software component and/or a combination of a hardware component and software component. For example, the device and component described in the embodiments may be implemented using a processor, a controller, an arithmetic logic unit (ALU), a digital signal processor, a microcomputer, a field programmable gate array (FPGA), a programmable logic unit (PLU), a microprocessor or one or more general-purpose computers or special-purpose computers, such as any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible.

Software may include a computer program, a code, an instruction or a combination of one or more of them and may configure a processing device so that the processing device operates as desired or may instruct the processing devices independently or collectively. The software and/or the data may be embodied in any type of machine, a component, a physical device, virtual equipment, a computer storage medium or a device in order to be interpreted by the processor or to provide an instruction or data to the processing device. The software may be distributed to computer systems connected over a network and may be stored or executed in a distributed manner. The software and the data may be stored in one or more computer-readable recording media.

The method according to embodiments may be implemented in the form of a program instruction executable by various computer means and stored in a computer-readable medium. The computer-readable medium may include a program instruction, a data file, and a data structure solely or in combination. The program instruction stored in the medium may be specially designed and constructed for an embodiment, or may be known and available to those skilled in the computer software field. Examples of the computer-readable medium include magnetic media such as a hard disk, a floppy disk and a magnetic tape, optical media such as a CD-ROM and a DVD, magneto-optical media such as a floptical disk, and hardware devices specially configured to store and execute a program instruction, such as a ROM, a RAM, and a flash memory. Examples of the program instruction include not only machine language code produced by a compiler, but a high-level language code which may be executed by a computer using an interpreter, etc.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

We claim:

1. An image processing method for de-identifying and restoring image information, which is performed by an image processing system, comprising:
   - detecting at least one object information area in image information;
   - de-identifying the detected object information area by using an encryption key generated in relation to the detected object information area; and
   - restoring the de identified object information area by using the encryption key,
   - wherein the de-identifying comprises de-identifying the detected object information area such that the de-identified object information area is classified differently in accordance with a type of an object included in the object information area, and
   - wherein restoring the de-identified object information area comprises classifying an object included in the restored object information area depending on a type of the restored object information area.

2. The image processing method of claim 1, wherein de-identifying the detected object information area comprises de-identifying the detected object information area through any one or more of a first method based on a sorting table and a second method based on a random reversible table by using the encryption key generated in relation to the detected object information area.

3. The image processing method of claim 2, wherein de-identifying the detected object information area comprises
   - firstly de-identifying the detected object information area through one of the first method based on the sorting table and the second method based on the random reversible table; and
   - secondly de-identifying the firstly de-identified object information area through the other of the first method based on the sorting table and the second method based on the random reversible table.

4. The image processing method of claim 2, wherein de-identifying the detected object information area comprises
   - de-identifying a first portion of the detected object information area through one of the first method based on the sorting table and the second method based on the random reversible table; and
   - de-identifying a second portion of the detected object information area through the other of the first method based on the sorting table and the second method based on the random reversible table, the second portion being the remainder of the detected object information area where the first part is excluded.

5. The image processing method of claim 1, wherein the detecting comprises detecting a plurality of object information areas in the image information, and wherein:
   - encryption keys are generated in relation to the detected object information areas and each of the encryption keys is used as a seed value of a pseudo random function, and
   - a different encryption key among the encryption keys is assigned to each of the object information areas detected in the image information.

6. The image processing method of claim 2, wherein de-identifying the detected object information area comprises:
   - constructing the sorting table in which locations of pixels are rearranged in the detected object information area through a pseudo random function generated based on the encryption key, and
   - rearranging the pixels of the detected object information area by using the constructed sorting table.

7. The image processing method of claim 2, wherein de-identifying the detected object information area comprises:
   - constructing the random reversible table in which pixel values are modulated in the detected object information area through a pseudo random function generated based on the encryption key, and
   - modulating each of the pixel values of the detected object information area by using the constructed random reversible table.

8. The image processing method of claim 7, wherein the modulated pixel values are determined based on a sum of the random reversible table and the pixel values.

9. The image processing method of claim 1, wherein restoring the de-identified object information area comprises:
   - constructing a sorting table in which locations of pixels are rearranged in the de-identified object information area through a pseudo random function generated based on the encryption key, and
   - performing a reverse operation on the de-identified object information area by using the constructed sorting table.

10. The image processing method of claim 1, wherein restoring the de-identified object information area comprises:
    - constructing a random reversible table in which pixel values are modulated in the de-identified object information area through a pseudo random function generated based on the encryption key, and
    - restoring an original pixel value in the de-identified object information areas from each of the modulated pixel values in the de-identified object information area by using the constructed random reversible table.

11. The image processing method of claim 10, wherein original pixel values in the de-identified object information areas are restored based on a difference between the modulated pixel values and the random reversible table.

12. The image processing method of claim 1, wherein detecting the object information area comprises detecting the object information area in the image information by using a learning model for object detection.

13. An image processing system for de-identifying and restoring image information, comprising:
    - at least one processor configured to execute computer-readable instructions included in a memory,
    - wherein the at least one processor is configured to
    - detect at least one object information area in image information;
    - de-identify the detected object information area by using an encryption key generated in relation to the detected object information area; and
    - restore the de-identified object information area by using the encryption key,
    - wherein the at least one processor is configured to de-identify the detected object information area such that the de-identified object information area is classified differently in accordance with a type of an object included in the object information area, wherein the at least one processor is configured to classify an object included in the restored object information area depending on a type of the restored object information area.

14. An image processing method for de-identifying and restoring image information, which is performed by an image processing system, comprising:

detecting at least one object information area in image information;

de-identifying the detected object information area by using an encryption key generated in relation to the detected object information area; and restoring the de identified object information area by using the encryption key, wherein the de-identifying comprises de-identifying the detected object information area such that the de-identified object information area is classified differently in accordance with a type of an object included in the object information area, wherein the detecting comprises detecting a plurality of object information areas in the image information, and the image processing method further comprises grouping the object information areas into at least two groups based on a preset criterion, and wherein a different encryption key is assigned to each of the two groups as the encryption key for an object information area included said each of the two groups.

* * * * *